US011940953B2

(12) United States Patent
Modeo et al.

(10) Patent No.: US 11,940,953 B2
(45) Date of Patent: Mar. 26, 2024

(54) ASSISTED UPDATING OF ELECTRONIC DOCUMENTS

(71) Applicant: International Business Machines Corporation, Armonk, NY (US)

(72) Inventors: Leonardo Modeo, Rome (IT); Alessandro Umbrico, Rome (IT)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 16/694,793

(22) Filed: Nov. 25, 2019

(65) Prior Publication Data

US 2021/0157770 A1 May 27, 2021

(51) Int. Cl.

| | |
|---|---|
| ***G06F 17/00*** | (2019.01) |
| ***G06F 16/16*** | (2019.01) |
| ***G06F 40/221*** | (2020.01) |
| ***G06F 40/30*** | (2020.01) |
| ***G06Q 10/105*** | (2023.01) |

(52) U.S. Cl.

CPC .......... *G06F 16/164* (2019.01); *G06F 40/221* (2020.01); *G06F 40/30* (2020.01); *G06Q 10/105* (2013.01)

(58) Field of Classification Search

None

See application file for complete search history.

(56) References Cited

U.S. PATENT DOCUMENTS

| | | | | |
|---|---|---|---|---|
| 8,775,465 | B2 | 7/2014 | Peyrichoux | |
| 8,949,242 | B1 | 2/2015 | Lin | |
| 10,268,667 | B1 * | 4/2019 | Pachikov | G06F 40/166 |
| 2005/0165795 | A1 * | 7/2005 | Myka | H04L 65/60 |
| 2010/0030813 | A1 * | 2/2010 | Peyrichoux | G06F 16/958 |
| 2010/0250340 | A1 * | 9/2010 | Lee | G06Q 50/18 715/833 |
| 2010/0318982 | A1 | 12/2010 | Lumley | |
| 2014/0143646 | A1 | 5/2014 | Branton | |
| 2015/0100382 | A1 | 4/2015 | Malhotra | |
| 2015/0161218 | A1 * | 6/2015 | Linsley | G06F 16/9535 707/722 |
| 2016/0078102 | A1 * | 3/2016 | Crouch | G06F 16/313 707/722 |
| 2016/0162461 | A1 * | 6/2016 | Simon | G06F 3/0484 715/220 |
| 2017/0060995 | A1 * | 3/2017 | Boule | G06F 16/33 |
| 2019/0068703 | A1 | 2/2019 | Vora | |
| 2021/0049163 | A1 * | 2/2021 | Levy | G06F 16/245 |

* cited by examiner

*Primary Examiner* — Mustafa A Amin

(74) *Attorney, Agent, or Firm* — Grant M. McNeilly

(57) ABSTRACT

A method of updating the content of an electronic document includes receiving a metadata file by a server, the metadata file including document information regarding a subject matter of the electronic document and reference information regarding other sources of content referenced in the electronic document, and searching the other sources of content for corresponding information to the subject matter of the electronic document. The method also includes analyzing semantically the corresponding information, comparing the corresponding information to the electronic document to find inconsistencies, and generating an enriched metadata file including updated content suggested for the electronic document based on the inconsistencies.

20 Claims, 11 Drawing Sheets

FIG. 7A

AUDITING PROCESS – Corporate Legal Department – Version 2.0

References

| Title | Authors | Date | Version |
|---|---|---|---|
| Business Conduct Guide | Corp Legal; Control | 2019-01-01 | 2.0 |
| Finance Control System | Finance; Control | 2019-01-01 | 3.0 |

Show/Hide Comment

UPDATER GENERAL COMMENT 1:
Referenced document #1 has a more recent version 2.5 (date created 2019-04-01) [link_to_referenced_doc_1]

<< >>

UPDATER GENERAL COMMENT 2:
Referenced document #2 has a more recent version 4.0 (date created 2019-10-01) [link_to_referenced_doc_2]
Significant changes detected, see list of proposed updates at Section 1.3 [link_to_Auditing_Process_sec_1-3]

<< >>

UPDATER GENERAL COMMENT 3:
New item #3 in domain having contents referring to “auditing” [link_to_new_item_3]

<< >>

UPDATER GENERAL COMMENT 4:
New item #4 in domain having contents referring to “control” [link_to_new_item_4]
Significant changes detected, see list of proposed updates at Section 2.6 [link_to_Auditing_Process_sec_2-6]

<< >>

Page 1

FIG. 7B

AUDITING PROCESS – Corporate Legal Department – Version 2.0

Section 1.3

The section relates to operation aspects of management…
…[text]…
…[text]…
…[text]…

Show/Hide Comment

SIGNIFICANT CHANGE #1:
Operation managers will have to ensure compliance with new Corporate Instruction No. 224.66 – review for new content to add to Section 1.3 [link_to_Corp_Inst_No_224-66]
[ACKNOWLEDGE CHANGE] // [IGNORE CHANGE]

<<
>>

Moreover, several factors must be taken into account when making a such decisions: project scope, deadline, ~~and available resources~~ projected cost, and staffing.
…[text]…
…[text]…
…[text]…
…[text]…
…[text]…

Show/Hide Comment

SIGNIFICANT CHANGE #2:
Paragraph 33 of referenced document #2 refers to factors “project scope, deadline, projected cost, and staffing”.
[link_to_referenced_doc_2_para_0033]
[ACCEPT CHANGE] // [REJECT CHANGE]

<<
>>

Page 9

ASSISTED UPDATING OF ELECTRONIC DOCUMENTS

BACKGROUND

The present invention relates to managing electronic documents, and more specifically, to suggesting updates to electronic documents that include references to other content.

Documents can have a lifecycle that can end, for example, because their content becomes obsolete or inconsistent with other content, which can include any other documents that are referred to in the document itself. Traditional word processors do not assist or warn human document users about the existence of new documents whose content may be relevant for the sake of the document integrity and/or consistency. Neither do traditional word processors analyze the other documents being referenced. Therefore, a document may not include the most up-to-date information when it is consulted at a later time after its creation, which can have negative effects for the user.

SUMMARY

According to some embodiments of the present disclosure, a method of updating the content of an electronic document includes receiving a metadata file by a server, the metadata file including document information regarding a subject matter of the electronic document and reference information regarding other sources of content referenced in the electronic document, and searching the other sources of content for corresponding information to the subject matter of the electronic document. The method also includes analyzing semantically the corresponding information, comparing the corresponding information to the electronic document to find inconsistencies, and generating an enriched metadata file including updated content suggested for the electronic document based on the inconsistencies.

According to some embodiments of the present disclosure, an electronic document updating system includes a client computing device, a server communicatively connected to the client computing device, the server including a computer processing circuit, and a computer-readable storage medium storing instructions, which, when executed by the computer processing circuit, are configured to cause the computer processing circuit to perform a method. The method includes receiving a metadata file by a server, the metadata file including document information regarding a subject matter of the electronic document and reference information regarding other sources of content referenced in the electronic document. The method also includes searching the other sources of content for corresponding information to the subject matter of the electronic document, analyzing semantically the corresponding information, comparing the corresponding information to the electronic document to find inconsistencies, and generating an enriched metadata file including updated content suggested for the electronic document based on the inconsistencies.

BRIEF DESCRIPTION OF THE DRAWINGS

FIGS. 7A and 7B are graphical views of example remarks from a document assistant system, according to an embodiment of the present disclosure.

DETAILED DESCRIPTION

The present disclosure describes an automated document assistant system that can be integrated for use with a document editor. The various embodiments described herein generally relate to electronic documents with self-updating capabilities. More specifically, the various embodiments describe techniques that can actively (autonomously) detect parts of documents and/or references contained therein that have become obsolete and/or inconsistent with related content that resides in a specific domain.

The system can analyze the content of a document then search, collect, and analyze other content sources in the domain to see if the document is consistent with the other content. If not, the system can provide annotations and/or update suggestions for the user to review and accept or reject through the document editor. Furthermore, the system can draft new and/or replacement sections for the document and can automatically implement them in the document if permitted to do so by the user. One reason for prompting the system to perform these tasks can be that the document specifically references other content (e.g., there is a list of referenced documents and links in a bibliography and/or reference section). The system can analyze this other content to see whether it has been updated, obsoleted, and/or superseded since the document was created (or since the previous iteration of analysis of the other content).

In other words, the system is an automated assistant to help a document's user (e.g., owner, editor, reader, etc.) with the task of keeping the document up-to-date and consistent with itself and other content. For example, an organization can have a large set of documentation including operating procedures that should constantly be kept up-to-date with respect to the related documentation. More specifically, changes to one procedure document may suggest changes that should be made to related procedure documents. It would be beneficial to the organization for an automated system to inform a user of one of the related procedure documents that there may be updates due to the changes to other procedure documents. Therefore, the present disclosure provides an automated assistant that can extend the lifecycle of documents by indicating or making changes to the documents after other related content changes.

Figure 1:
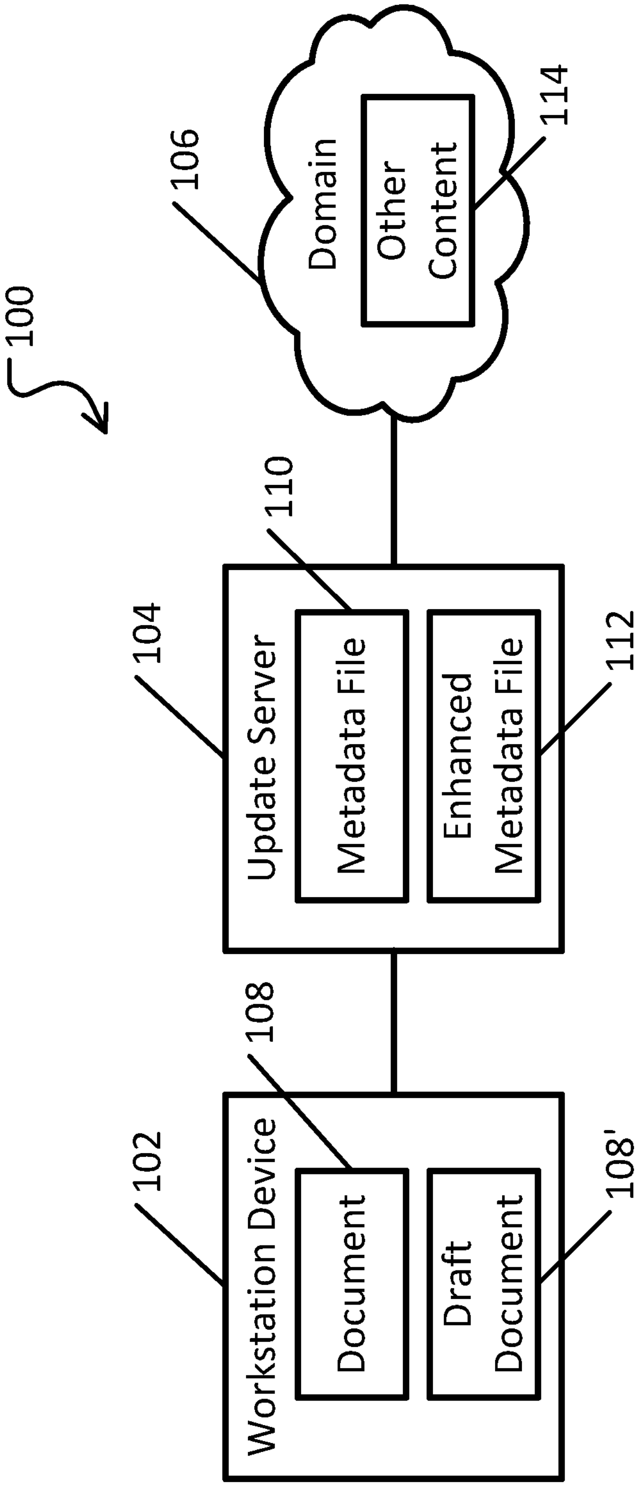
FIG. 1 is schematic view of a computing environment, according to an embodiment of the present disclosure.

FIG. 1 is schematic view of computing environment 100, according to an embodiment of the present disclosure. Three main subsystems of computing environment are identified: client 102, update server 104, and domain 106. Client 102 can be where the document 108 as well as the document editing and publishing software reside (along with, for example, an enterprise document management system). Client 102 can be a computing device such as, for example, a workstation, desktop or laptop computer, smartphone, or tablet. Client 102 can extract (parse) and send (push) all the relevant information about document 108 to update server 104.

In the illustrated embodiment, update server 104 can be where metadata file 110 can be made and used to search domain 108 and analyze the results. Update server 104 also can use these results to make enriched metadata file 112 that includes the suggested document updates that will be sent back to client 102. Update server 104 is communicatively connected to client 102 and domain 106. In some embodiments, client 102 can push information to and pull information from update server 104 because client 102 may not always be in operation with the document editing software running. Together, client 102 and update server 104 can be considered a document assistant system for updating documents.

In the illustrated embodiment, domain 106 is a space that includes a knowledge base that can be searched (crawled) and indexed by update server 104 in order to find, for example, other content 114. Other content 114 can be analyzed and deemed as relevant to the subject matter of document 108 and thereby used for updating document 108. Domain 106 can be, for example, the Internet, an intranet, a document management system, a hard drive, a flash drive, and/or cloud storage or subsections of any of those. Other content 114 can be, for example, electronic books, websites, forums, files, emails, messages, and/or databases that may or may not be specifically mentioned or cited in document 108.

While other content 114 can be related to some or all of the subject matter of document 108, domain 106 can include a significant amount of content that is unrelated to document 108. Therefore, it can be helpful to limit the content searched in domain 106 to content that is relevant to document 108. This can occur during operation of computing environment 100, wherein client 102 can request an update regarding document 108 and collecting descriptive information about document 108. This descriptive information can be entered manually by a user (not shown) or extracted through natural language processing techniques (such as semantic analysis), and the descriptive information can include, for example, title subject matter, keywords (collectively known as a "word cloud"), last modified date, owner, creator, publishing department, and/or references list (e.g., documents or links mentioned in document 108). This descriptive information can be pushed to update server 104, which will in turn crawl domain 106 seeking relevant information (such as other content 114) to use for possible updates to document 108. The crawling can occur simultaneously for multiple documents in the situation where there are multiple update requests. In some embodiments, the descriptive information about document 108 can include a keyword, topic, and/or a portion of document 108 that is of special interest to the user, for example, because that portion is about a topic for which information changes rapidly. Thereby, the more limited scope of the searching of domain 106 can occur to prioritize potential updates about that topic and/or to conserve computing resources by limiting the scope of the searching.

Once the searching has been performed, update server 104 can analyze other content 114. The analysis can occur on two levels—on the metadata level and on the content level. Analysis on the metadata level can show whether other content 114 may have changed since the last time it was reviewed. For example, the metadata of each different item in other content 114 can be analyzed to determine if, for example, the document version has changed, if the date of publication/republication is after the last review, if the initial publication date is substantially old, or if there are new and/or different section headings. If the metadata-level analysis indicates, for example, a substantially high probability of changes or if it is inconclusive, then analysis on the content level can occur. In other embodiments, the metadata-level analysis is not performed or does not factor into the decision to move forward with content-level analysis.

Content-level analysis can compare other content 114 to document 108 to determine if there are any inconsistencies therebetween. Based on the metadata-level and/or content-level analyses, suggestions can be provided back to client 102. The suggestions can be tailored to the sophistication of the request. For example, if the request is only a rapid check of the metadata of other content 114, then the return may simply be a list of items in other content 114 that can be reviewed for possible changes. For another example, if the request is an in-depth analysis on the content-level, then the return can be rewrites of entire paragraphs. In such an example, update server 104 can employ advanced text processing and recognition techniques, which may be in turn can be based on semantic text processing as well as cognitive algorithms.

Update server 104 can package its annotations and suggestions in an enriched metadata file, which can be pulled by client 102. The document editing software can then deploy the annotations and the suggestions to document 108 by proposing a new draft document 108' for review by the user. In some embodiments, if such capability is enabled, the suggested changes can be made directly in document 108, which can eliminate review by the user and creation of draft document 108'.

Figure 2:
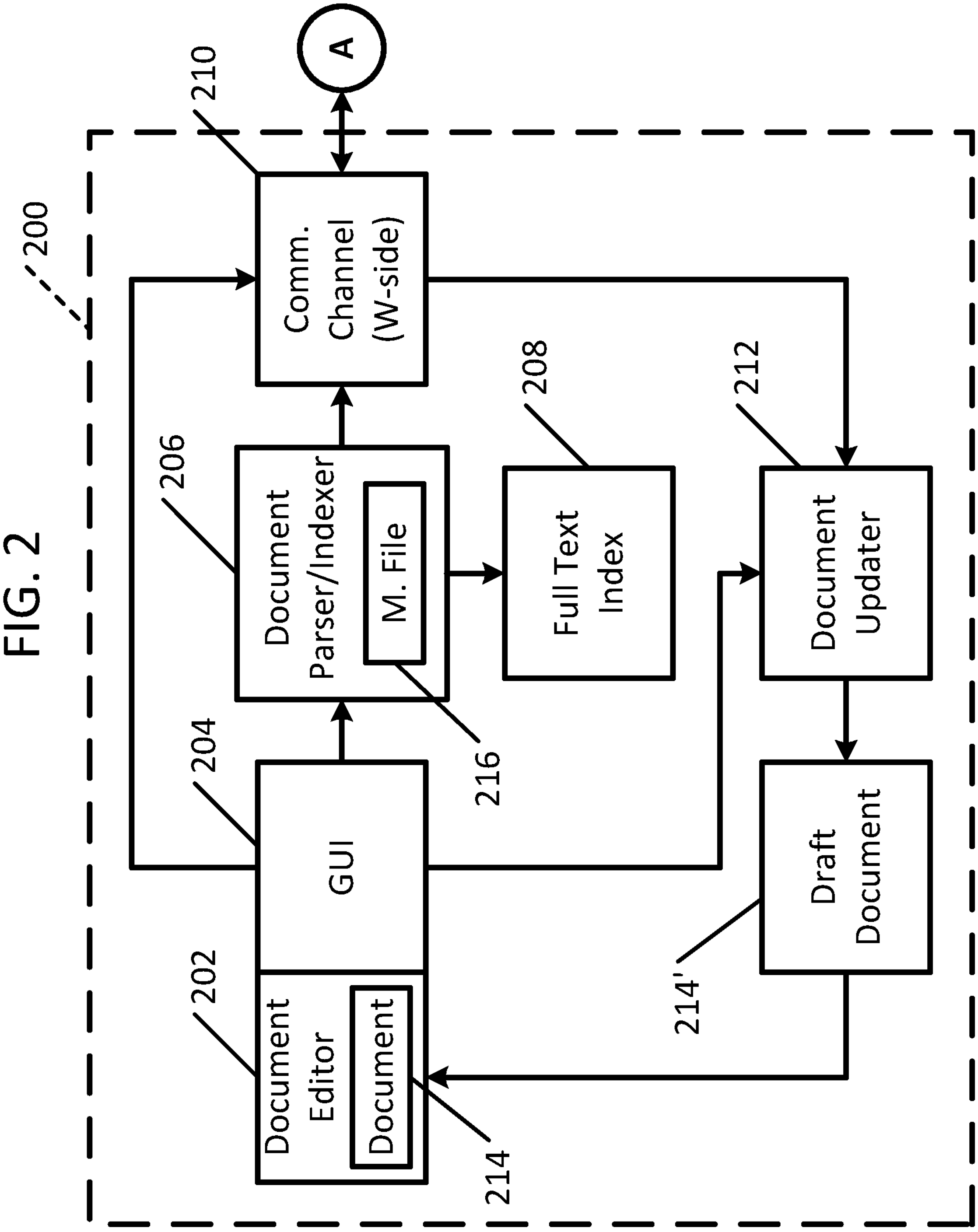
FIG. 2 is a schematic view of a client-side of the computing environment, according to an embodiment of the present disclosure.

FIG. 2 is a schematic view of a client-side of a computing environment, which can be representative of client 102 of computing environment 100 (both shown in FIG. 1). Depicted in FIG. 2 are client 200 which can include document editor 202, graphical user interface (GUI) 204, document parser and indexer 206, full text index 208, communication channel 210 (client-side), document updater 212, document 214, new draft document 214', and metadata file 216.

Figure 3:
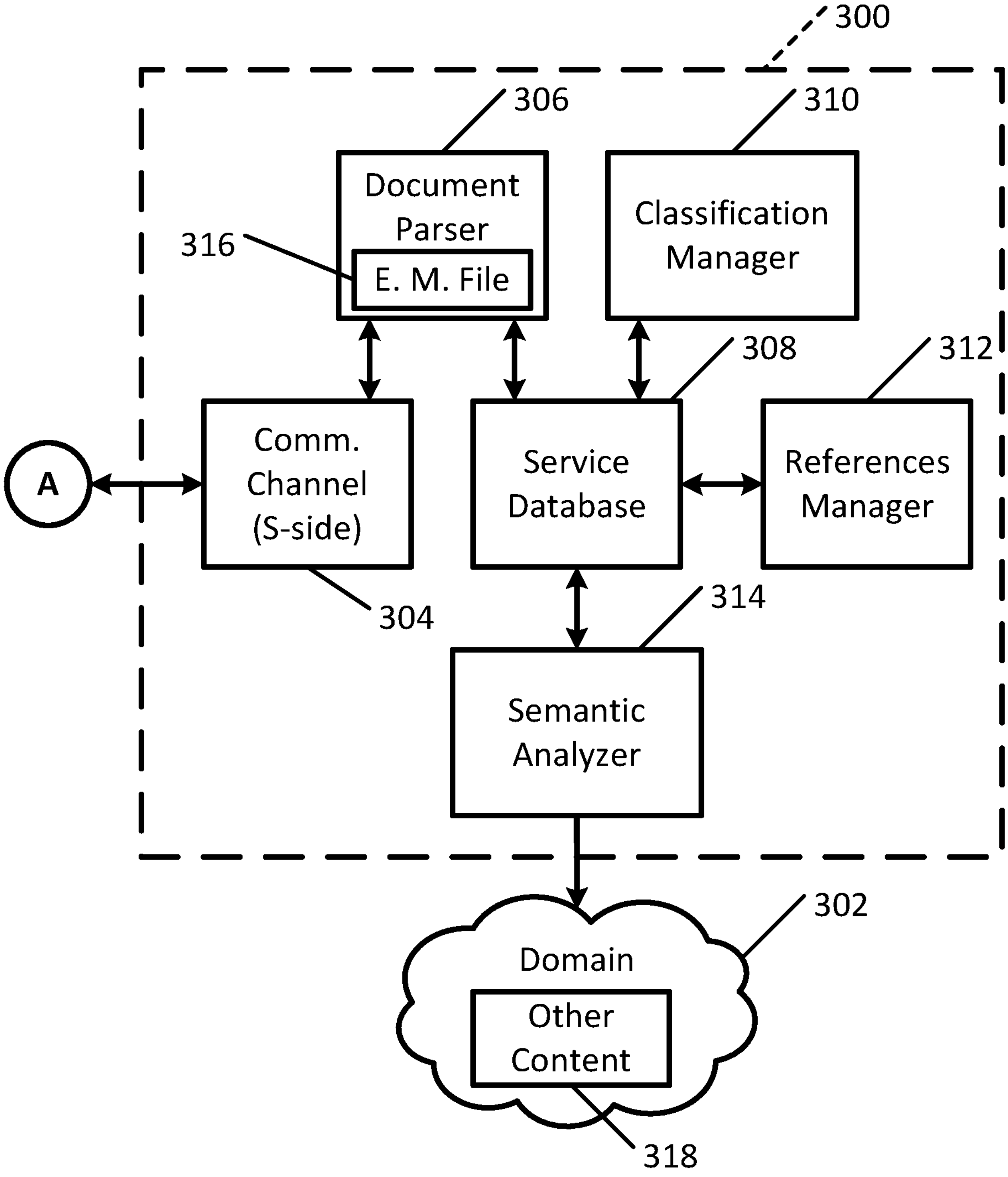
FIG. 3 is a schematic view of a server-side of the computing environment, according to an embodiment of the present disclosure.

In the illustrated embodiment, document parser and indexer 206 can leverage the application programming interface(s) (API(s)) that document editor 202 provides to analyze document 214. In some embodiments, document parser and indexer 206 can include and/or be connected to its own and/or third-party libraries (not shown) for the purpose of document parsing. The action of parsing document 214 can yield the title, document index, list of referenced/cross-referenced documents, date of issue/publication, version/revision number, author, paragraph structure (e.g., numbered items, headings), images, and/or content. In some embodiments, document 214 can have minimal but common structuring (e.g., date, list of references, cross-references, title, author, version, etc.). The output of the parsing can be metadata file 216 (e.g., a file in JavaScript Object Notation (JSON) format and/or an Extensible Markup Language (XML) format) structure that embodies some or all the aforementioned descriptive information in a unique metadata message. Thereby, metadata file 216 can be subsequently handled by communication channel 210 to be pushed to the server-side system of the computing environment (an example of which is shown in FIG. 3).

The local full-text processing performed by document parser and indexer 206 can result in the construction of full text index 208 that records the positions (e.g., pages, lines, paragraph numbers, etc.) of the indexed text and extracted images within the document. Full text index 208 can then be used when making draft document 214' after update information has been pulled by the server-side system of the computing environment by communication channel 210. More specifically, full text index 208 can be used to locate places where annotations and update will be positioned in draft document 214'.

GUI 204 can be integral to, an add-on component of, or an extension for document editor 202, and GUI 204 can provide the user with management and configuration functionalities of client 200. For example, the user can enable or disable automatic update requests (e.g., occurring periodically and/or whenever the document is opened) or manually request an update of document 214. For another example, descriptive information (e.g., document type, subject matter, keywords, etc.) about document 214 can be manually entered through GUI 204, as can other update related information, such as uniform resource locators (URLs) to indicate domains of interest that should be searched during an update (possibly to find new information regarding the subject matter of document 214). This descriptive information can be conveyed to the server-side of the computing environment as part of a "header" of metadata file 216. GUI 204 can also be used to review different versions of document 214 (including draft document 214'), for example, to see annotations and suggestions made from updates.

In the illustrated embodiment, document updater 212 can pull any available updates from the server-side of the computing environment. The update can be in the form of a metadata file (e.g., enriched metadata file 112, shown in FIG. 1) whose structure and content can be similar to metadata file 216, although it can be enriched with the results of any updates (e.g., annotations and/or suggestions). Document updater 212 can use the enriched metadata file to produce draft document 214' by injecting the updates into document 214. More specifically, the updates can be deployed by parsing the enriched metadata and using the API(s) of document editor 202 to manipulate document 214 into draft document 214'. The updates can be deployed in the form of comments within or extended to the text of draft document 214' by leveraging full text index 208.

FIG. 3 is a schematic view of a server-side of a computing environment, which can be representative of update server 104 and domain 106 of computing environment 100 (all shown in FIG. 1). Depicted in FIG. 3 are update server 300 and domain 302. More specifically, update server 300 can include communication channel 304, document parser 306, service database 308, classification manager 310, references manager 312, and semantic analyzer 314. Update server 300 can be running on local infrastructure (e.g., on-premises), remote infrastructure, and/or cloud infrastructure.

In the illustrated embodiment, document parser 306 can process the metadata file (e.g., metadata file 216, shown in FIG. 2) received from the client-side of the computing environment (an example of which is shown in FIG. 2, and the possible communicative connection therebetween is denoted by the encircled "A" in FIGS. 2 and 3). More specifically, document parser 306 can extract content and/or text from the metadata file, generate or compute the word cloud of the primary document (e.g., document 214, shown in FIG. 2), identify referenced/cross-referenced documents, extract information from embedded images, and extract manually-entered descriptive information (e.g., document type, subject matter, keywords, etc.). All of this information can be stored in a data structure that can be accessible by the other components/modules of update server 300. In addition, document parser 306 can build enriched metadata file 316 once the update analysis has been completed, and enriched metadata file 316 can be stored in service database 308 for future reference and/or revision.

In the illustrated embodiment, references manager 312 can scroll through the list of referenced/cross-referenced documents in domain 302 to identify if there are any newer versions thereof compared to the original publication date or the date of the most recent update of the primary document. If there are one or more newer versions of referenced/cross-referenced documents, then an updated references list can be delivered to document parser 306 for inputting into enriched metadata file 316. In addition, this list can be saved in service database 308 and consulted during the next update to determine if there are even newer versions of the referenced/cross-referenced documents. Thereby, copies of each referenced/cross-referenced documents (and/or other relevant information) does not need to be saved or maintained by update server 302.

Classification manager 310 can perform an automatic classification of the primary document if no manual classification has been provided by the client-side of the computing environment. This automatic classification can be performed using context-sensitive analysis tools, as well as natural language processing and semantic analysis techniques. The outcome of automatic classification can be a set of areas of interest covered by the content of the primary document, which are known with an acceptable level of confidence. These areas of interest can be used to determine which portions of domain 302 to search through when updating the primary document.

Semantic analyzer 314 can find the newest and most relevant items in domain 302 (known as "other content 318") by using word cloud affinity with the primary document. Semantic analyzer 314 can also make all of other content 318 available for document parser 306 to use to make suggestions and produce enriched metadata file 316. In some embodiments, the analysis of domain 302 can be extended and/or refined with additional semantic comparison between the paragraphs (or surrounding context) where the most relevant terms in the word cloud are located in the primary document. This allows for the discovery of newer, emerging semantic aspects of the subject matter of the primary document that are in domain 302. Thereby, document parser 306 can propose the most up-to-date information to the user for incorporation into the primary document, regardless of these new sources of information having not been referenced by the primary document in the past. In some embodiments, the update search and analysis are limited to the referenced/cross-referenced documents in the primary document because the primary document may purposely have a perspective, position, point, argument, and/or purpose to which there is contrary information in other content 318. Thereby, contradictory update suggestions to the primary document can be avoided by so limiting the update, which can conserve user time that might otherwise be spent disposing of such inconsistent information.

Communication channel 304 can respond to the push/pull requests raised by the client-side of the computing environment. Any push requests can be handed over to document parser 306 to begin the update process. Any pull requests can be handed over to document parser 306 which will in turn formulate or find enriched metadata file 316 and send it via communication channel 304. Communication channel 304 will deliver enriched metadata file 316 to the requesting client-side peer (e.g., communication channel 210, shown in FIG. 2).

Figure 4:
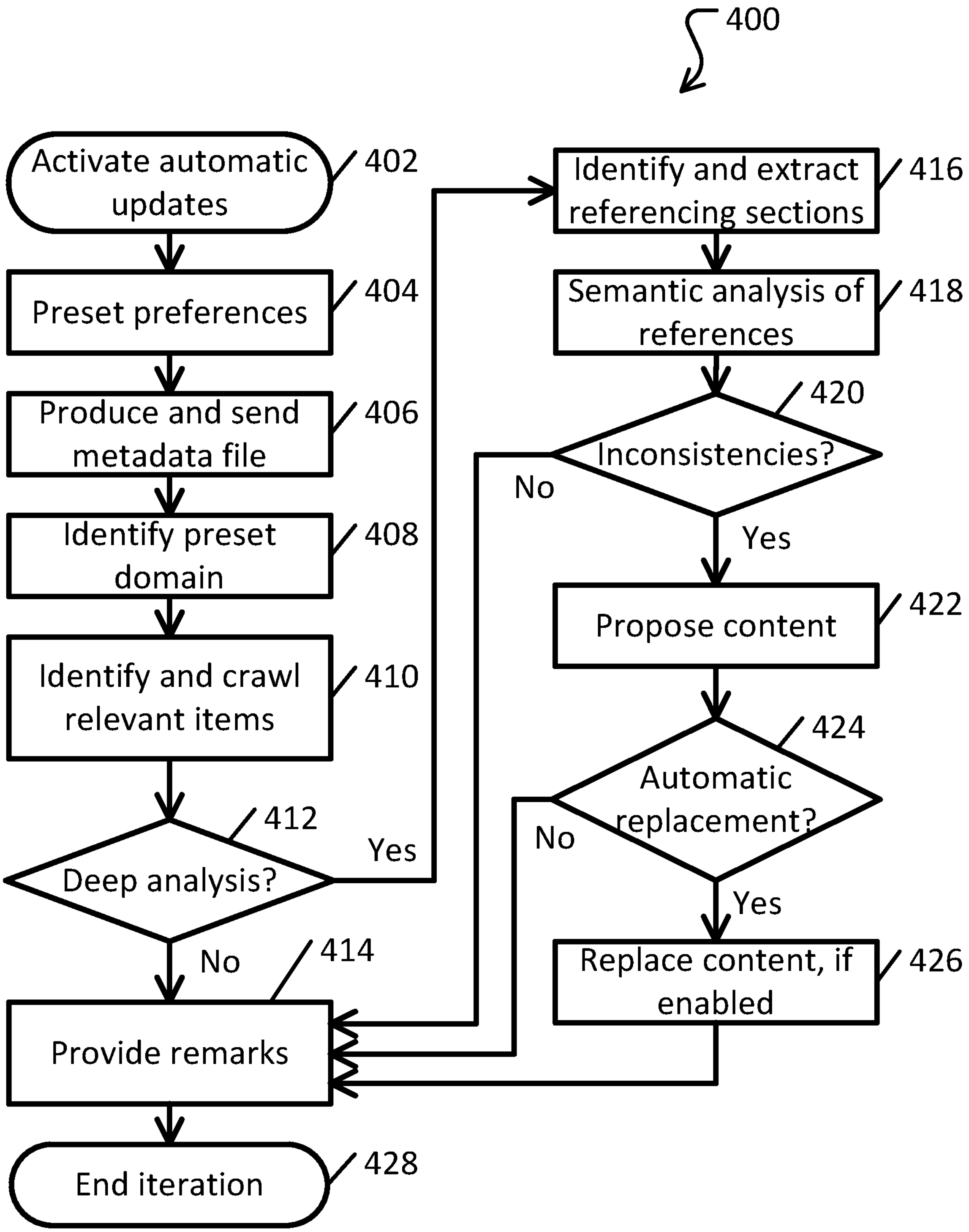
FIG. 4 is a flowchart of a method of operating a document assistant system, according to an embodiment of the present disclosure.

FIG. 4 is a flowchart of one embodiment of an example method 400 of operating a document assistant system. Method 400 starts at block 402, wherein automatic updates for a given primary document are activated in the client-side of the system. At block 404, preferences are set for the update, for example, the scope of the domain being searched (e.g., solely referenced/cross-referenced documents or the entirety of the domain or the descriptive information about the document). At block 406, the metadata file is produced and sent to the server-side of the system. At block 408, the relevant portion of the domain is identified. At block 410, that portion of the domain is searched, relevant items (e.g., documents, images, etc.) are identified, and the relevant items themselves are searched for metadata that is relevant with respect to the primary document. In the embodiment where only referenced/cross-referenced documents are being searched, blocks 408 and 410 can be combined.

At block 412, whether to do a deep analysis of any of the relevant items is determined, for example, by analyzing the metadata of the relevant items with respect to the metadata of the relevant items from the previous update and/or the metadata from the publication of the primary document. If deep analysis is inappropriate (e.g., because none of the relevant items have been changed since the last update), then method 400 moves to block 414 wherein a communication is issued (e.g., an enhanced metadata file is created) that states that there were no updates from the current update iteration. If deep analysis is appropriate, then method 400 moves to block 416 wherein the relevant items themselves are searched for sections that are relevant to the content of the primary document. At block 418, the relevant sections are semantically analyzed.

At block 420, the semantic analysis of the relevant sections of the relevant items is compared to a semantic analysis of the primary document to determine if there are inconsistencies and/or contradictions therebetween. If there aren't, then method 400 moves to block 414 wherein a communication is issued (e.g., an enhanced metadata file is created) that states that there were no updates from the current update iteration. If there are, then method 400 moves to block 422 wherein annotations and/or suggested text are formulated. At block 424, whether automatic updates have been enabled is determined. If not, then method 400 moves to block 414 wherein an enhanced metadata file is created that includes the annotations and/or suggested text. If so, then method moves to block 426 wherein an enhanced metadata file is created, sent to the client-side where the suggested text is automatically implemented in the primary document. Then at block 414, a communication is issued stating that a new version of the primary document has been created (which can include any annotations from block 422). At block 428, the current update iteration of method 400 ends.

Figure 5:
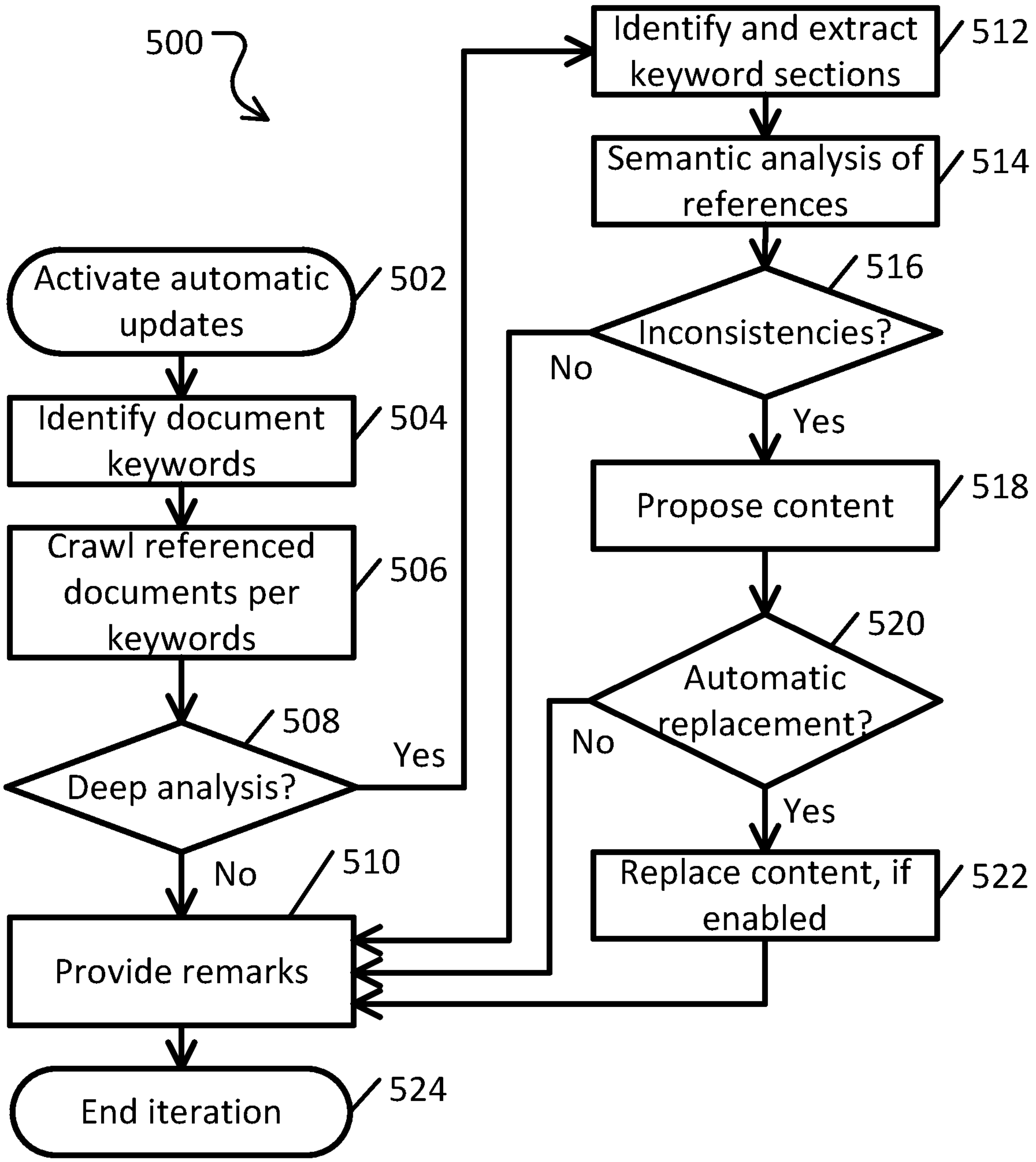
FIG. 5 is a flowchart of an alternate embodiment method of operating a document assistant system, according to an embodiment of the present disclosure.

FIG. 5 is a flowchart of an alternate embodiment method 500 of operating a document assistant system. Method 500 starts at block 502, wherein automatic updates for a given primary document are activated in the client-side of the system. At block 504, the primary document is semantically analyzed to identify its descriptive information (e.g., keywords and list of referenced/cross-referenced documents). At block 506, the metadata file is produced and sent to the server-side of the system, and the referenced/cross-referenced documents themselves are searched for metadata that is relevant with respect to the primary document.

At block 508, whether to do a deep analysis of any of the relevant items is determined, for example, by analyzing the metadata of the relevant items with respect to the metadata of the relevant items from the previous update and/or the metadata from the publication of the primary document. If deep analysis is inappropriate (e.g., because none of the relevant items have been changed since the last update), then method 500 moves to block 510 wherein a communication is issued (e.g., an enhanced metadata file is created) that states that there were no updates from the current update iteration. If deep analysis is appropriate, then method 500 moves to block 512 wherein the relevant items themselves are searched for sections that are relevant to the content of the primary document. At block 514, the relevant sections are semantically analyzed.

At block 516, the semantic analysis of the relevant sections of the relevant items is compared to a semantic analysis of the primary document to determine if there are inconsistencies and/or contradictions therebetween. If there aren't, then method 500 moves to block 510 wherein a communication is issued (e.g., an enhanced metadata file is created) that states that there were no updates from the current update iteration. If there are, then method 500 moves to block 518 wherein annotations and/or suggested text are formulated. At block 520, whether automatic updates have been enabled is determined. If not, then method 500 moves to block 510 wherein an enhanced metadata file is created that includes the annotations and/or suggested text. If so, then method moves to block 522 wherein an enhanced metadata file is created, sent to the client-side where the suggested text is automatically implemented in the primary document. Then at block 510, a communication is issued stating that a new version of the primary document has been created (which can include any annotations from block 518). At block 524, the current update iteration of method 500 ends.

Figure 6:
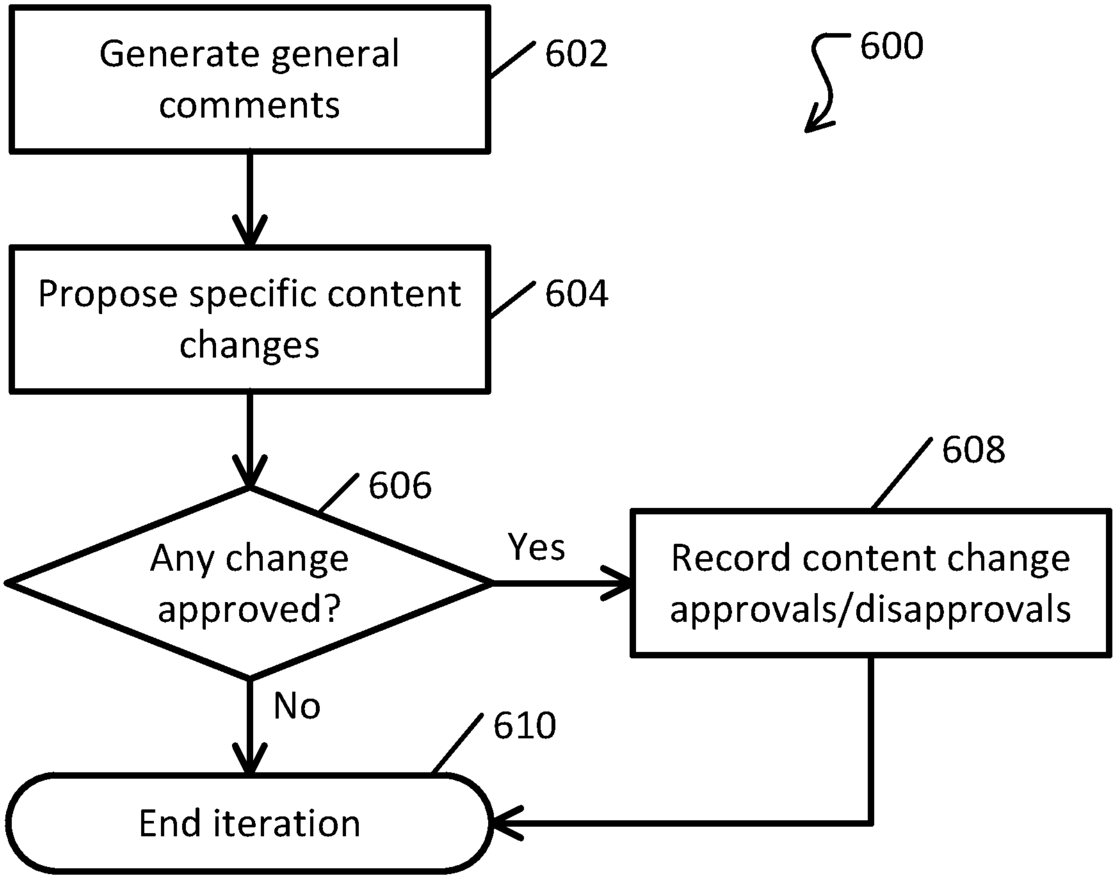
FIG. 6 is a flowchart of a method of providing remarks by a document assistant system, according to an embodiment of the present disclosure.

FIG. 6 is a flowchart of one embodiment of an example method 600 of providing and implementing remarks by a document assistant system. Method 600 can be used, for example, at block 414 of method 400 (shown in FIG. 4) and/or block 510 of method 500 (shown in FIG. 5).

Method 600 starts at block 602 wherein general comments are generated. Examples of general comments are "no updates at this time", "no new information found", and "the annotations and proposed updates are included in the draft document". At block 604, specific annotations and/or proposed text are generated. At block 606, each proposed text section is either approved or disapproved. If at least one of the proposed text sections is approved, then its approval (as well as any disapprovals of proposed text sections) can be recorded at block 608. Then method ends at block 610.

In the illustrated embodiment, if all of the proposed text sections are disapproved, then method 600 ends at block 610. In other embodiments, if all of the proposed text sections are disapproved, then the disapprovals can be recorded at block 608. In other embodiments, block 608 is omitted regardless of the approvals or disapprovals of the proposed text sections.

FIGS. 7A and 7B are graphical views of example annotations and suggestions in an updated document such as, for example, draft document 108' (shown in FIG. 1) or draft document 214' (shown in FIG. 2). FIGS. 7A and 7B represent an enriched metadata file having been incorporated into a fictitious document and displayed in a GUI for a user to interact with.

The following is a sample metadata file (such as metadata file 110, shown in FIG. 1):

```
[START CODE]
<?xml version-“1.0” encoding=“UTF-8”?>
<doc__base__template__updater>
    <header>
        <title>AUDITING PROCESS</title>
        <version>2.0</version>
        <date__created>the doc date created (consistent with doc version)
        </date__created>
        <author role=“auditor”>Corporate Legal Department</author>
        <domains__list>comma separated list of domains (e.g HR,Finance,Legal)
        </domains__list>
        <enable>a boolean equal to true or false</enable>
        <deep__analysis>a boolean equal to true or false</deep__analysis>
        <manual__classification>comma separated list of classification (e.g.
            employee retention guidelines,budget control practices,government
            contract and negotiation)</manual__classification>
        <topics__of__special__interest>employee,operations management,italian
            legislation</topics__of__special__interest>
        <!-- please not that the document “word cloud” is computed by the backend system -->
        <computed__keywords__cloud>
            <keyword>
                <name>auditing</name>
                <weight>80</weight>
                <list__of__document__sections>comma separated list of
                  par__no</list__of__document__sections>
            </keyword>
            <keyword>
                <name>control</name>
                <weight>70</weight>
                <list__of__document__sections>comma separated list of
                  par__no</list__of__document__sections>
            </keyword>
            <keyword>
                <name>operations</name>
                <weight>70</weight>
                <list__of__document__sections>comma separated list of
                  par__no</list__of__document__sections>
            </keyword>
        </computed__keywords__cloud>
    </header>
    <document__references__list>
        <reference>
            <ref__id>1</ref__id>
            <ref__version>2.0</ref__version>
            <ref__title>Business Conduct Guide</ref__title>
            <ref__date>01/01/2019</ref__date>
            <ref__authors__list>
            <author>Corp Legal</author>
            <author>Control</author>
            </ref__authors__list>
        </reference>
        <reference>
            <ref__id>2</ref__id>
            <ref__version>3.0</ref__version>
            <ref__title>Finance Control System</ref__title>
            <ref__date>01/01/2019</ref__date>
            <ref__authors__list>
            <author>Finance</author>
            <author>Control</author>
            </ref__authors__list>
        </reference>
    </document__references__list>
    <list__of__media__content>
        <media ref=“figure__1”>
            <media__type>mimetype</media__type>
            <media__title>organization chart</media__title>
            <media__content>media__content</media__content>
        </media>
        <media ref=“figure__2”>
            <media__type>mimetype</media__type>
            <media__title>approval process</media__title>
            <media__content>media__content</media__content>
        </media>
    </list__of__media__content>
    <doc__body>
    <doc__section par__no=“1”
      ref__list=“comma__separated__list__of__references__as__per__reference__list__eg__1,2”>
```

-continued

```
        This chapter describes the main topics related to proper procedure and practices... Also refer
    to....
        <doc__section par__no=“1.1” ref__list=“comma__...”>
        This paragraph describes operational aspects of management....
            <doc__section par__no=“1.1.1”>
            The employee card has to have a minimum attainment score....
            </doc__section>
        </doc__section>
        <doc__section par__no=“1.3” ref__list=“comma__...” >
        The section relates to operation aspects of management...
        </doc__section>
    </doc__section>
    </doc__body>
</doc__base__template__updater>
[END CODE]
```

The following is a sample enriched metadata file (such as enriched metadata file 112, shown in FIG. 1):

```
[START CODE]
<?xml version-"1.0" encoding="UTF-8"?>
<doc__base__template__updater>
    <header>
        <title>AUDITING PROCESS</title>
        <version>2.0</version>
        <date__created>the doc date created (consistent with doc version)
        </date__created>
        <author role=“auditor”>Corporate Legal Department</author>
        <domains__list>comma separated list of domains (e.g HR,Finance,Legal)
        </domains__list>
        <enable>a boolean equal to true or false</enable>
        <deep__analysis>a boolean equal to true or false</deep__analysis>
        <manual__classification>comma separated list of classification (e.g.
            employee retention guidelines,budget control practices,government
            contract and negotiation)</manual__classification>
        <topics__of__special__interest>employee,operations management,italian
            legislation</topics__of__special__interest>
        <computed__keywords__cloud>
            <keyword>
                <name>auditing</name>
                <weight>80</weight>
                <list__of__document__sections>comma separated list of
                   par__no</list__of__document__sections>
            </keyword>
            <keyword>
                <name>control</name>
                <weight>70</weight>
                <list__of__document__sections>comma separated list of
                   par__no</list__of__document__sections>
            </keyword>
            <keyword>
                <name>operations</name>
                <weight>70</weight>
                <list__of__document__sections>comma separated list of
                   par__no</list__of__document__sections>
            </keyword>
        </computed__keywords__cloud>
    </header>
    <document__references__list>
        <reference>
            <ref__id>1</ref__id>
            <ref__version>2.0</ref__version>
            <ref__title>Business Conduct Guide</ref__title>
            <ref__date>01/01/2019</ref__date>
            <ref__authors__list>
            <author>Corp Legal</author>
            <author>Control</author>
            </ref__authors__list>
        </reference>
        <reference>
            <ref__id>2</ref__id>
            <ref__version>3.0</ref__version>
            <ref__title>Finance and Operations Control System</ref__title>
            <ref__date>01/01/2019</ref__date>
            <ref__authors__list>
            <author>Finance</author>
```

-continued

```
            <author>Control</author>
        </ref_authors_list>
    </reference>
</document_references_list>
<list_of_media_content>
    <media ref="figure_1">
        <media_type>mimetype</media_type>
        <media_title>organization chart</media_title>
        <media_content>media_content</media_content>
    </media>
    <media ref="figure_2">
        <media_type>mimetype</media_type>
        <media_title>approval process</media_title>
        <media_content>media_content</media_content>
    </media>
</list_of_media_content>
<doc_body>
<doc_section par_no="1"
    ref_list="comma_separated_list_of_references_as_per_reference_list_eg_1,2">
    This chapter describes the main topics related to proper procedure and practices... Also refer
    to....
        <doc_section par_no="1.1" ref_list="comma_...">
        This paragraph describes operational aspects of management....
            <doc_section par_no="1.1.1">
            The employee card has to have a minimum attainment score....
            </doc_section>
        </doc_section>
</doc_section>
<doc_section par_no="1.3" ref_list="comma_..." >
    The section relates to operation aspects of management...
    </doc_section>
</doc_body>
<comments>
    <comment ref_id="1">
        Referenced document has a more recent version 2.5: date created 04/01/2019. See also
        "..link to reference doc...
    </comment>
    <comment ref_id="2">
        Referenced document has a more recent version 4.0: date created 04/01/2019. See also
        "..link to reference doc...
        Significant changes detected. See list of proposed updates at para.
        "..list_of_comma_separated_doc_sections..."
    </comment>
    <comment keyword="auditing">
        New item #3 in domain having contents referring to "auditing" [link_to_new_item_3]
    </comment>
    <comment keyword="control">
        New item #4 in domain having contents referring to "control" [link_to_new_item_4]
        Significant changes detected, see list of proposed updates at Section 2.6
[link_to_Auditing_Process_sec_2-6]
    </comment>
</comments>
<proposed_updates>
    <update par_no="1.3">
        Operation managers will have to ensure compliance with new Corporate Instruction No.
        224.66 - review for new content to add to Section 1.3 [link_to_Corp_Inst_No_224-66]
    </update>
    <update par_no="1.3">
        Paragraph 33 of referenced document #2 refers to factors "project scope, deadline,
        projected cost, and staffing". [link_to_referenced_doc_2_para_0033]
    </update>
</proposed_updates>
</doc_base_template_updater>
[END CODE]
```

Figure 8:
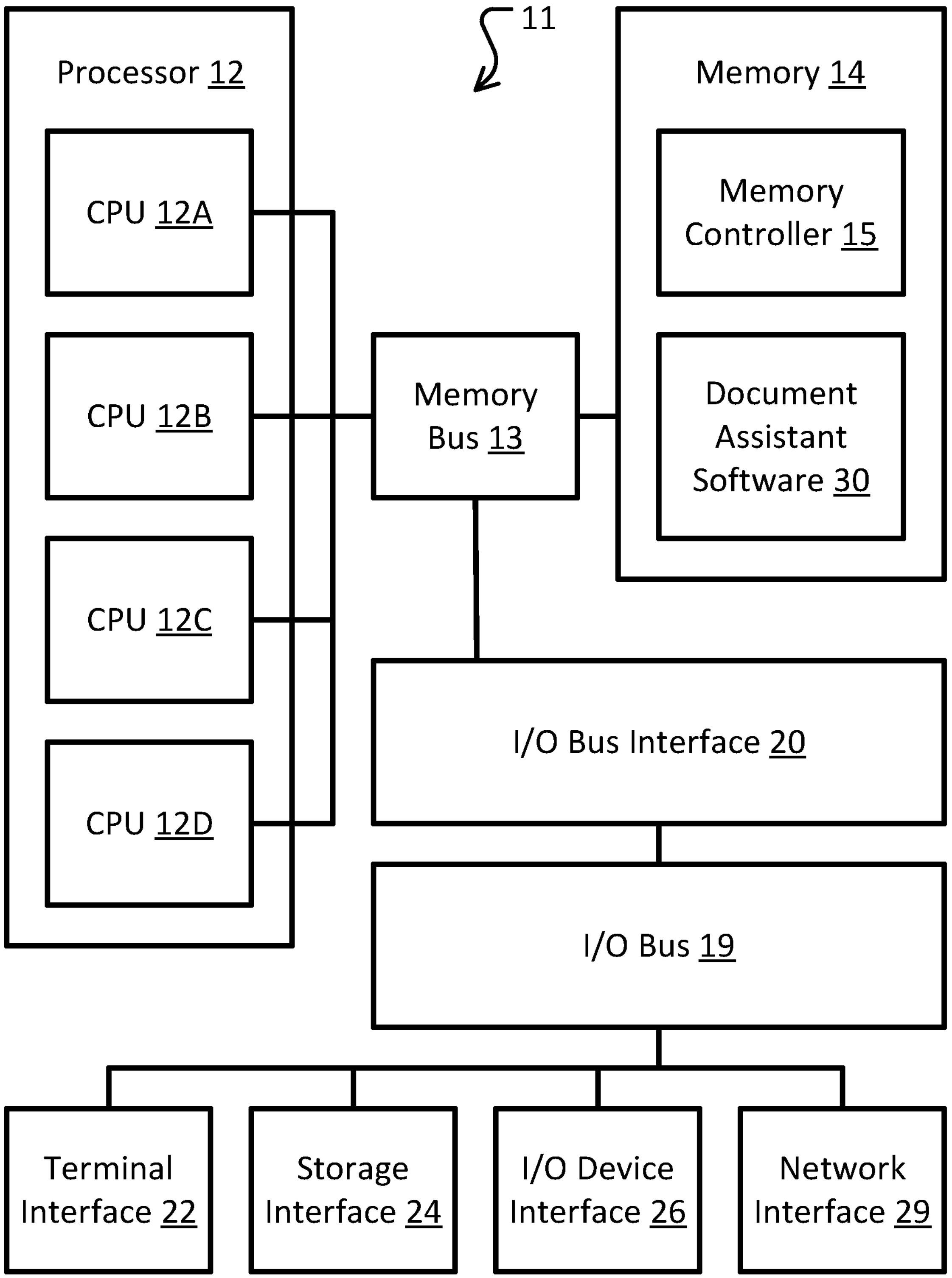
FIG. 8 shows a high-level block diagram of an example computer system that can be used in implementing embodiments of the present disclosure.

Referring now to FIG. 8, shown is a high-level block diagram of an example computer system (i.e., computer) 11 that may be used in implementing one or more of the methods or modules, and any related functions or operations, described herein (e.g., using one or more processor circuits or computer processors of the computer), in accordance with embodiments of the present disclosure. For example, computer system 11 can be used in client 102 and/or update server 104 (both shown in FIG. 1). In some embodiments, the components of the computer system 11 may comprise one or more CPUs 12, a memory subsystem 14, a terminal interface 22, a storage interface 24, an I/O (Input/Output) device interface 26, and a network interface 29, all of which may be communicatively coupled, directly or indirectly, for inter-component communication via a memory bus 13, an I/O bus 19, and an I/O bus interface unit 20.

The computer system 11 may contain one or more general-purpose programmable central processing units (CPUs) 12A, 12B, 12C, and 12D, herein generically referred to as the processer 12. In some embodiments, the computer system 11 may contain multiple processors typical of a relatively large system; however, in other embodiments the computer system 11 may alternatively be a single CPU system. Each CPU 12 may execute instructions stored in the memory subsystem 14 and may comprise one or more levels of on-board cache.

In some embodiments, the memory subsystem 14 may comprise a random-access semiconductor memory, storage device, or storage medium (either volatile or non-volatile) for storing data and programs. In some embodiments, the memory subsystem 14 may represent the entire virtual memory of the computer system 11 and may also include the virtual memory of other computer systems coupled to the computer system 11 or connected via a network. The memory subsystem 14 may be conceptually a single monolithic entity, but, in some embodiments, the memory subsystem 14 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 14 may contain elements for control and flow of memory used by the processor 12. This may include a memory controller 15.

Although the memory bus 13 is shown in FIG. 8 as a single bus structure providing a direct communication path among the CPUs 12, the memory subsystem 14, and the I/O bus interface 20, the memory bus 13 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 20 and the I/O bus 19 are shown as single respective units, the computer system 11 may, in some embodiments, contain multiple I/O bus interface units 20, multiple I/O buses 19, or both. Further, while multiple I/O interface units are shown, which separate the I/O bus 19 from various communications paths running to the various I/O devices, in other embodiments some or all of the I/O devices may be connected directly to one or more system I/O buses.

In some embodiments, the computer system 11 may be a multi-user mainframe computer system, a single-user system, or a server computer or similar device that has little or no direct user interface but receives requests from other computer systems (clients). Further, in some embodiments, the computer system 11 may be implemented as a desktop computer, portable computer, laptop or notebook computer, tablet computer, pocket computer, telephone, smart phone, mobile device, or any other appropriate type of electronic device.

In the illustrated embodiment, memory subsystem 14 further includes document assistant software 30. The execution of document assistant software 30 enables computer system 11 to perform one or more of the functions described above in assisting with document updating (for example, methods 400, 500 and/or 600, shown in FIGS. 4-6, respectively).

It is noted that FIG. 8 is intended to depict representative components of an exemplary computer system 11. In some embodiments, however, individual components may have greater or lesser complexity than as represented in FIG. 8, components other than or in addition to those shown in FIG. 8 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
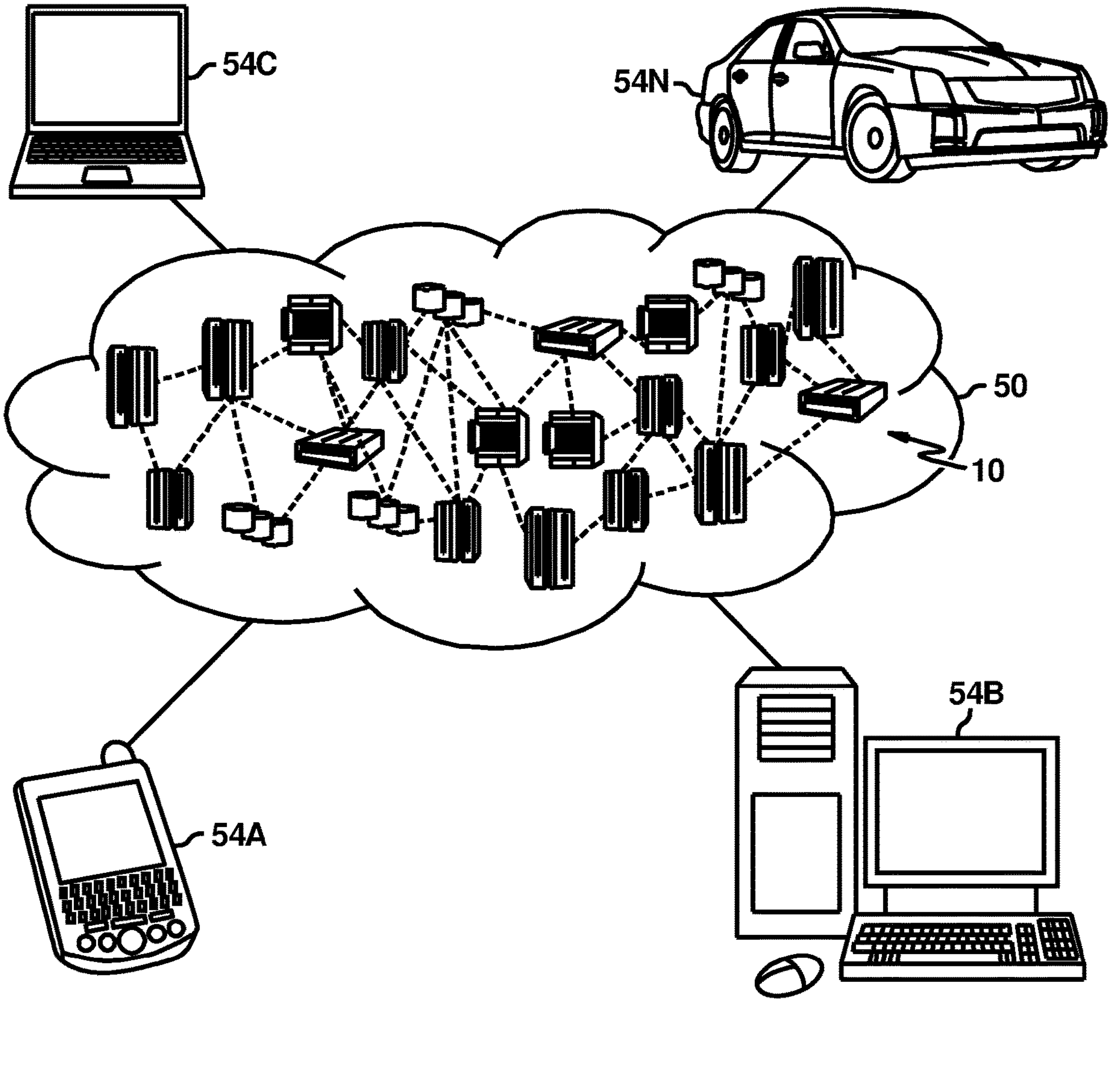
FIG. 9 shows a cloud computing environment according to embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
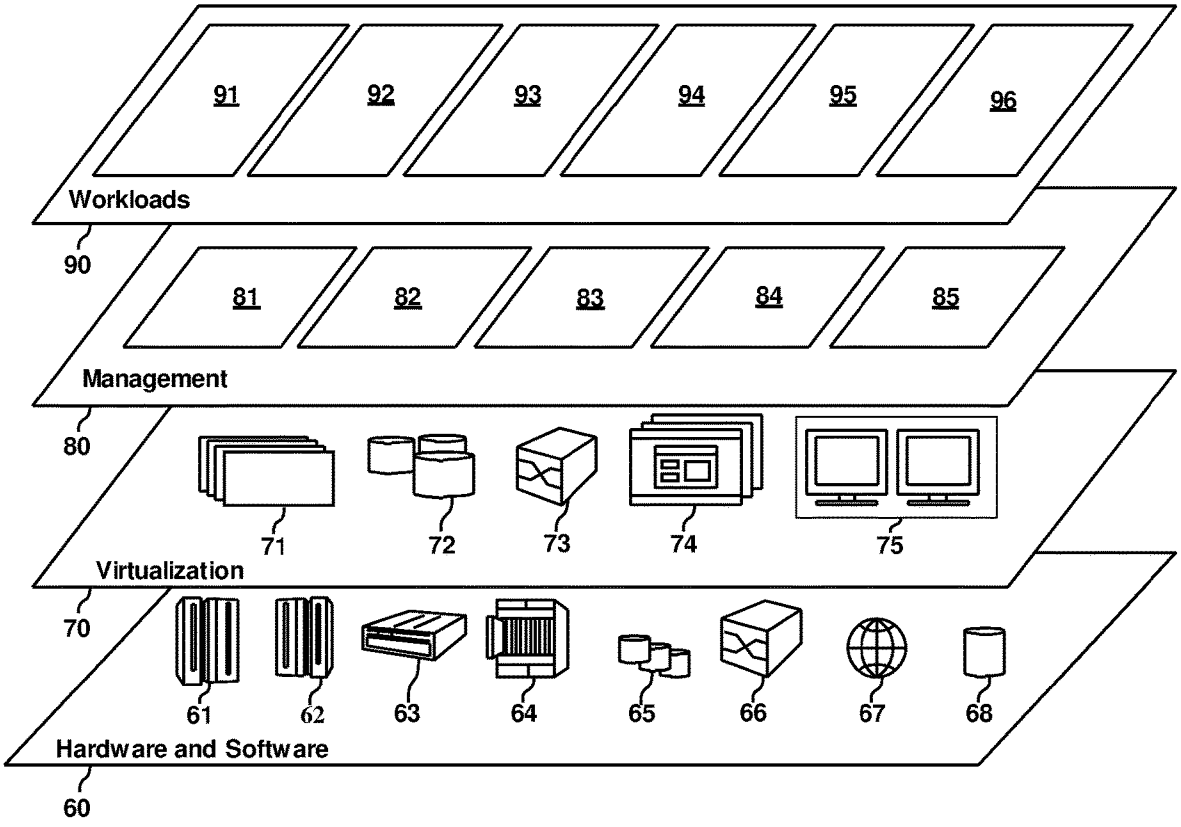
FIG. 10 shows abstraction model layers according to embodiments of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document assistant system 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of updating content of an electronic document, the method comprising:

receiving a metadata file by a server from a document parser and indexer, the metadata file including manually-entered descriptive information about the electronic document, a plurality of keywords regarding a subject matter of the electronic document, a full text index of the content of the electronic document, and reference information regarding other sources of content referenced in the electronic document;

calculating a word cloud extracted from the electronic document, wherein the word cloud comprises the plurality of keywords;

cross-referencing documents based on the word cloud and semantic comparisons between the cross-referenced documents and surrounding contexts of the electronic document where terms in the word cloud are located;

searching the other sources of content for corresponding information to the subject matter of the electronic document based on the word cloud, cross-referenced documents, and semantic comparisons;

analyzing semantically the corresponding information;

comparing the corresponding information to the electronic document to find inconsistencies; and generating an enriched metadata file including updated content suggested for the electronic document based on the inconsistencies, wherein the enriched metadata file includes positions for the updated content based on the full text index.

2. The method of claim 1, wherein the semantic analyzing of the corresponding information occurs in response to:

comparing first metadata from a first time to second metadata from a second time that is later than the first time, wherein the first metadata and the second metadata relate to one of the other sources; and finding differences between the first metadata and the second metadata.

3. The method of claim 1, wherein the metadata file is in a JavaScript Object Notation (JSON) format and/or an Extensible Markup Language (XML) format.

4. The method of claim 1, further comprising:

generating the metadata file by a client;

sending the metadata file by the client.

5. The method of claim 4, wherein generating the metadata file further comprises:

analyzing semantically the electronic document to synthesize the plurality of keywords; and receiving user input keywords related to the subject matter of the electronic document via a client graphical user interface.

6. The method of claim 1, further comprising:

analyzing semantically the electronic document prior to comparing the corresponding information to the electronic document to find inconsistencies.

7. The method of claim 1, further comprising:

sending the enriched metadata file to a client for review by a user.

8. The method of claim 1, further comprising:

adding a notation to the electronic document regarding the updated content, wherein the enriched metadata file includes a position for the notation based on the full text index.

9. The method of claim 1, further comprising:

replacing automatically outdated content in the electronic document with the updated content in the enriched metadata file.

10. The method of claim 1, wherein some of the plurality of keywords were extracted from metadata of embedded images in the electronic document.

11. The method of claim 1, wherein the full text index comprises positions of embedded images in the electronic document.

12. An electronic document updating system comprising:

a client computing device;

a server communicatively connected to the client computing device, the server including a computer processing circuit; and a computer-readable storage medium storing instructions, which, when executed by the computer processing circuit, are configured to cause the computer processing circuit to perform a method comprising:

receiving a metadata file by a server from a document parser and indexer, the metadata file including manually-entered descriptive information about the electronic document, a plurality of keywords regarding a subject matter of the electronic document, a full text index of content of the electronic document, and reference information regarding other sources of content referenced in the electronic document;

calculating a word cloud extracted from the electronic document, wherein the word cloud comprises the plurality of keywords;

cross-referencing documents based on the word cloud and semantic comparisons between the cross-referenced documents and surrounding contexts of the electronic document where terms in the word cloud are located;

searching the other sources of content for corresponding information to the subject matter of the electronic document based on the word cloud, and cross-referenced documents, and semantic comparisons;

analyzing semantically the corresponding information; comparing the corresponding information to the electronic document to find inconsistencies; and generating an enriched metadata file including updated content suggested for the electronic document based on the inconsistencies, wherein the enriched metadata file includes positions for the updated content based on the full text index.

13. The electronic document updating system of claim 12, wherein the semantic analyzing of the corresponding information occurs in response to:

comparing first metadata from a first time to second metadata from a second time that is later than the first time, wherein the first metadata and the second metadata relate to one of the other sources; and finding differences between the first metadata and the second metadata.

14. The electronic document updating system of claim 12, wherein the metadata file is in a JavaScript Object Notation (JSON) format and/or an Extensible Markup Language (XML) format.

15. The electronic document updating system of claim 12, wherein the method further comprises:

generating the metadata file by a client;

sending the metadata file by the client.

16. The electronic document updating system of claim 15, wherein generating the metadata file further comprises:

analyzing semantically the electronic document to synthesize the plurality of keywords; and receiving user input keywords related to the subject matter of the electronic document via a client graphical user interface.

17. The electronic document updating system of claim 12, wherein the method further comprises:

analyzing semantically the electronic document prior to comparing the corresponding information to the electronic document to find inconsistencies.

18. The electronic document updating system of claim 12, wherein the method further comprises:

sending the enriched metadata file to a client for review by a user.

19. The electronic document updating system of claim 12, wherein the method further comprises:

adding a notation to the electronic document regarding the updated content, wherein the enriched metadata file includes a position for the notation based on the full text index.

20. The electronic document updating system of claim 12, wherein the method further comprises:

replacing automatically outdated content in the electronic document with the updated content in the enriched metadata file.

* * * * *